United States Patent [19]
Blough

[11] 3,810,548
[45] May 14, 1974

[54] FLOATING APPARATUS FOR LIQUID COMPOSTING

[75] Inventor: Ronald S. Blough, Fairfield, Iowa

[73] Assignee: Fairfield Engineering and Manufacturing Company, Fairfield, Iowa

[22] Filed: Jan. 26, 1973

[21] Appl. No.: 326,948

[52] U.S. Cl............................. 210/242, 261/120
[51] Int. Cl............................................. C02c 1/10
[58] Field of Search...... 210/242, 220, 195; 261/87, 261/93, 120

[56] References Cited
UNITED STATES PATENTS
| | | | |
|---|---|---|---|
| 3,572,658 | 3/1971 | Ravitts | 261/120 X |
| 3,669,422 | 6/1972 | Nogaj | 210/242 X |
| 3,680,845 | 8/1972 | Carlsmith et al. | 210/242 X |

Primary Examiner—Roy Lake
Assistant Examiner—DeWalden W. Jones
Attorney, Agent, or Firm—Wolfe, Hubbard, Leydig, Voit & Osann, Ltd.

[57] ABSTRACT

A floating apparatus for aerating and circulating animal waste material for use preferably in a realtively deep reservoir and comprising an outer float assembly for floatingly supporting the apparatus on the surface of the material in the reservoir, a roatable hollow shaft extending downwardly into the material, the lower end of which is adapted to permit air to exit therefrom, and axial thrust propeller rigidly attached to the lower end of the shaft, drive means for rotating the shaft and propeller to draw air downwardly out of the lower end of the shaft and generate a plurality of small bubbles and propel them downwardly into the material. The apparatus also has a barrier including a hollow cylinder concentrically surrounding the shaft, the barrier being adapted to prevent foaminated material from surrounding the drive means and shutting off the supply of air at the upper end of the hollow shaft.

12 Claims, 6 Drawing Figures

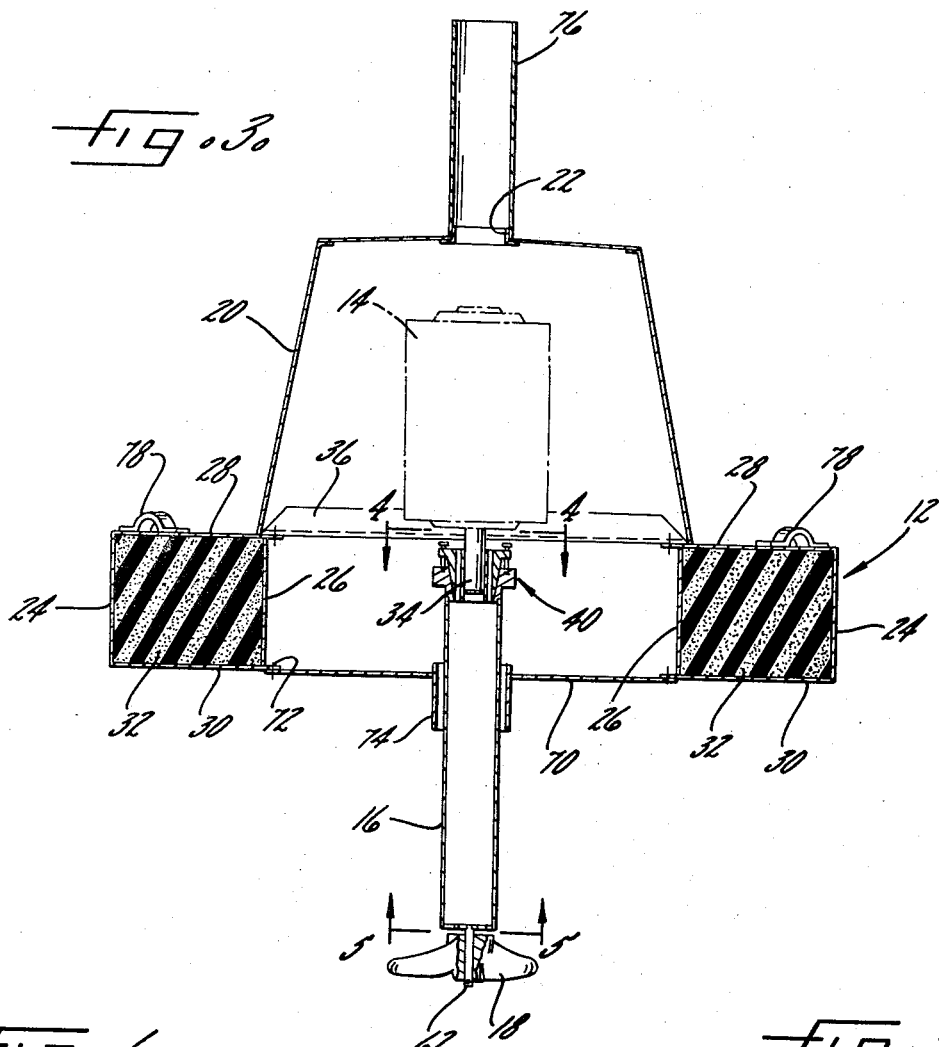
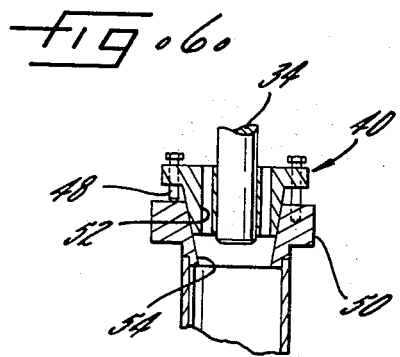
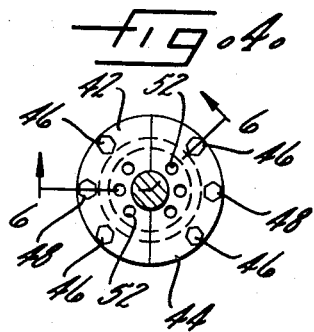
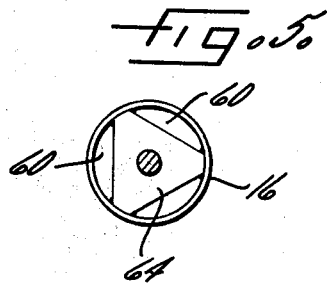

FLOATING APPARATUS FOR LIQUID COMPOSTING

The present invention relates generally to the liquid composting art and, more specifically, to apparatus for liquid composting animal waste material.

Continued activity in the field of treatment of sewage and particularly in liquid composting has demonstrated that large numbers of farm animals may be kept in a relatively small area without the expected accompanying odors. As is set forth in the application of Ronald S. Blough and Robert D. Jones entitled Apparatus for Liquid Composting, Ser. No. 135,597, now U.S. Pat. No. 3,778,233, which is assigned to the same assignee as the present invention, it is disclosed that under properly controlled conditions, animal wastes and the like may be broken down into components which may be used as fertilizer, may be recycled into animal feedstuffs, or may be merely disposed of, without creating either a health hazard or a pollution problem. Bacterial breakdown of sewage waste material is essentially performed by one of two basic processes; namely, aerobic and anaerobic. The anaerobic process does not require oxygen and is therefore the prevailing process by which bacterial breakdown occurs where any substantial accumulation of waste is present, such as in manure lagoons, septic tanks, and the like. While manure or animal waste will eventually break down and oxidize, the anaerobic process is accompanied by the production of noxious gases and has other disadvantages as well.

On the other hand, the aerobic process is performed by oxygen requiring aerobic bacteria and has numerous advantages over the anaerobic process. For example, chemical breakdown is achieved by aerobic bacteria without the generation of objectionable and noxious odors. Moreover, the process does not attract flies or other vermin and the fertilizer value in the processed liquid is retained. However, the aerobic bacteria require a constant supply of oxygen on which to thrive and, accordingly, such aerobic systems require continuous replenishment of dissolved oxygen which is consumed by the aerobes in the waste material. It is also advantageous to agitate the material to keep the waste particles in suspension in the water or the particles may settle out and become inaccessible for aerobic bacterial decomposition.

There have been many mechanical aerators and agitator designs for introducing oxygen into the waste material and for moving the material to prevent settling out of the suspended waste particles. What is most desirable, of course, is to introduce air into the material in the form of small bubbles as opposed to a stream of air pumped into the material or the like. The obvious reason is that the smaller the bubbles, the greater the ratio of bubble surface area to volume. This enables the oxygen to be more easily dissolved in the material, which is the intended result. Apparatus which will efficiently dissolve oxygen into the material is also of paramount importance for economic reasons. It should be understood that more power would be consumed by injecting substantial quantities of oxygen into the material that would not be dissolved and which would merely rise to the surface and be lost. It is also important that the power utilized to agitate or move the material within the reservoir should not be greater than absolutely required, since merely moving the material within the reservoir more than is necessary to keep the particles in suspension in and of itself serves no useful purpose.

The apparatus disclosed in the above referenced Blough and Jones U.S. Pat. No. 3,778,233 is adapted to introduce extremely fine bubbles and simultaneously circulate material within a ditch of limited width and depth.

Accordingly, it is an object of the present invention to provide apparatus that is adapted to efficiently inject extremely small bubbles into a reservoir of waste material that may be extremely large and quite deep.

Another object of the present invention is to provide apparatus that may be used in a limited area of a large, deep reservoir, wherein the apparatus does not require waste material directing or confining walls or the like for effective operation.

Still another object of the present invention is to provide apparatus for aerating and circulating waste material in a reservoir which is particularly adapted for use in a relatively deep reservoir in which the surface elevation of the material therein may vary over a relatively wide range, by virtue of the capability of the apparatus to float on the surface thereof. A related object of the present invention lies in the provision of its easy installation and removal, since the apparatus need only be tethered and provided with a power hook-up in the event an electric motor is utilized for driving the apparatus.

Yet another object of the present invention lies in the provision for insuring that a supply of air is maintained for injection into the material, even though a relatively thick foaminated material may be present as a result of the operation of the apparatus.

Other objects and advantages will become apparent upon reading the following detailed description while referring to the drawings, in which:

FIG. 4 is a sectional view of a portion of the apparatus of the present invention, and is taken generally along the line 4—4 of FIG. 3;

FIG. 5 is a sectional view of a portion of the apparatus in FIG. 3 and is taken generally along the line 5—5 of FIG. 3; and FIG. 6 is a sectional view of a portion of the apparatus and is taken generally along the line 6—6 of FIG. 4.

While the present invention will be described herein with certain preferred embodiments, it will be understood that the invention is not intended to be limited to those specific embodiments. On the contrary, it is intended to encompass all alternatives, modifications and equivalents that may be included within the spirit and scope of the invention as expressed in the appended claims.

Figure 1:
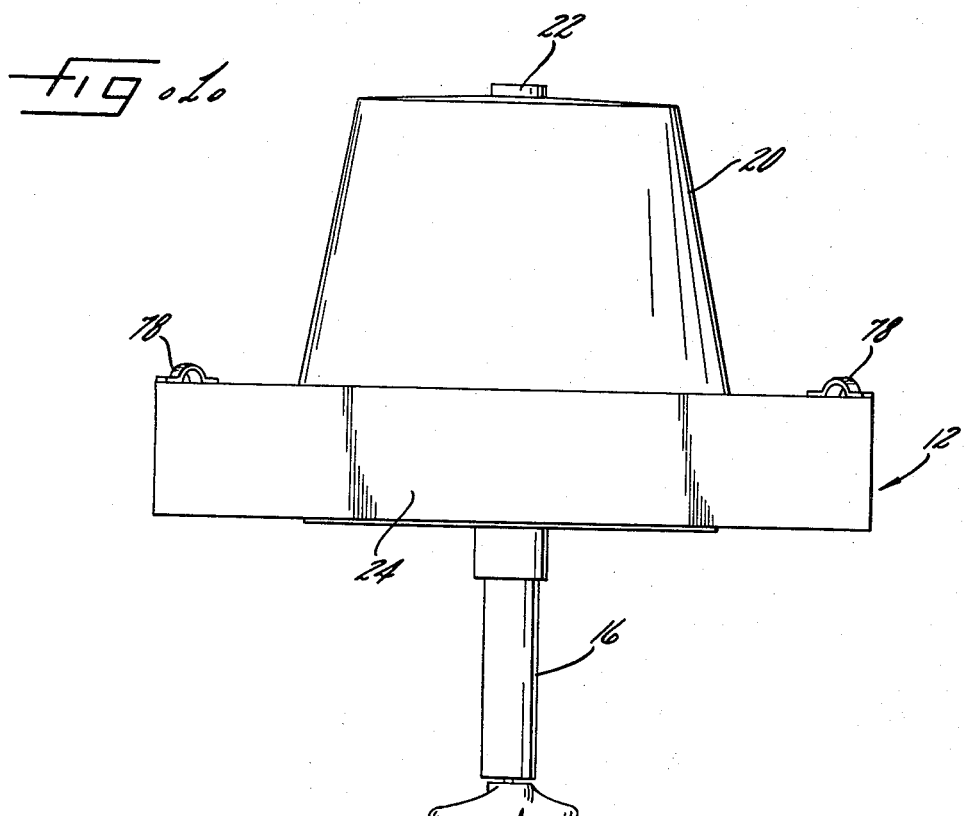
FIG. 1 is a side elevation of apparatus embodying the present invention.
Figure 2:
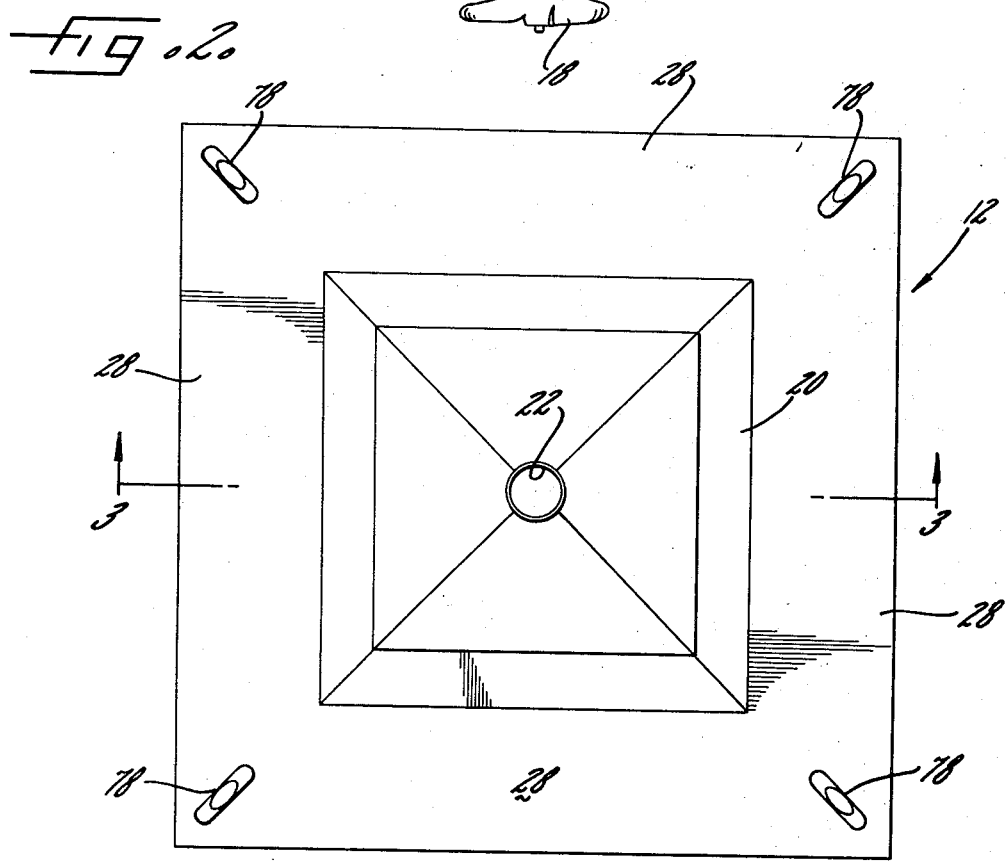
FIG. 2 is a top plan view of the apparatus embodying the present invention, and is taken generally along the line 3—3 in FIG. 2.

Turning now to the drawings and particularly FIGS. 1–3, a liquid composting apparatus embodying the present invention is shown and comprises a generally square shaped float assembly, indicated generally at 12, that is adapted to support a drive means 14, shown to be an electric motor to which a rotatable hollow shaft 16 is attached having an axial thrust propeller 18 rigidly secured to its lower end. The apparatus 12 preferably has an exterior enclosure 20 with an upwardly flanged aperture 22 in the top thereof for permitting air to enter the enclosure 20, all of which will be more comprehensively described hereinafter.

In keeping with an important aspect of the present invention, the float assembly 12 has a generally square shaped configuration when viewed from above as shown in FIG. 2, with each of the sides of the square having a rectangular cross section as is shown in FIG. 3. Thus, the float assembly has exterior vertical walls 24 as well as interior vertical walls 26 which, together with upper and lower horizontal walls 28 and 30, define a totally enclosed area that extends around the outer periphery of the apparatus to provide stability for the components that are positioned interiorly of the float assembly. Rather than sealing the walls of the float assembly 12 to provide the floating capability, it is preferred that the volume be displaced with a very light weight material such as foamed styrene plastic or the like to insure that the apparatus would not sink if one of the walls were punctured or damaged. By having the lightweight water displacing material therein, the float assembly may be relatively easily fabricated by merely bolting or riveting the sheets together in conventional fashion, since water tight seals at the junction of different pieces is not required.

The motor 14 is preferably mounted in a vertical position with its output shaft 34 extending downwardly, the motor being mounted on a suitable framework, such as angle irons 36 or the like which are suitably attached to the float assembly 12 by bolts or the like.

In keeping with the present invention and turning to FIGS. 3, 4 and 6, the rotatable hollow shaft 16 is secured to the motor output shaft 34 by using a collar fitting 40 that is adapted to enable air to enter into the hollow shaft 16 while firmly holding the two shafts together in a manner which permits vernier adjustments so that the two shafts may be accurately aligned relative to one another to minimize vibration. It is preferred that the collar fitting 40 be keyed to the motor shaft 34 by a conventional key (not shown) to prevent relative rotation between them. It is preferred that the collar fitting 40 be of the split type, having two symmetrical halves 42 and 44 as best shown in FIG. 6 and that the top portion extend outwardly to define an annular flange that is adapted to receive a number of bolts 46 and 48. To connect the shaft 16 to the collar fittings 40 an annular fitting 50 which is preferably permanently affixed to the upper end of the hollow shaft 16 by welding, brazing or the like is provided. As best shown in FIGS. 4 and 6, the bolts 46 extend through oversized apertures in the annular flange into threaded apertures within the fitting 50 and thereby hold the fittings 40 and 50 together, whereas the bolts 48 are held in threaded apertures within the flange of the fitting 40 and merely engage the top surface of the fitting 50 as shown. Thus, the bolts 48 are adapted to forcibly separate the fittings 40 and 50 from one another when the hollow shaft 16 is intended to be removed. As is best shown in FIG. 6, the lower outside surface 52 of the split collar fitting 40 is tapered to engage a cooperatively tapered inside surface 54 of the annular fitting 50 so that as the two fittings are drawn together by tightening the bolts 46, the two fittings will compressively engage one another. The split halves 42 and 44 will be forced together and will tighten the collar fitting 40 around the motor shaft 34 simultaneously as the two fittings are compressed together. Since the two fittings 40, 50 may be extremely tight after they have been attached together over a period of time, it has been found that the bolts 48 are often required to break the fitting apart if and when it is desired to remove the shaft 16.

To communicate air to the inside of the hollow shaft 16, the collar fitting 40 preferably is provided with apertures 52 therein, which in the illustrated embodiment there are three in each half thereof.

To introduce air adjacent the propeller, the hollow shaft 16 has a number of apertures at the lower end thereof which, in the embodiment illustrated in FIGS. 3 and 5 are shown at 60. The propeller 18 is affixed to a small diameter shaft 62 which is preferably permanently affixed to a triangular shaped member 64 that is also preferably welded to the interior surface of the hollow shaft 16.

The apparatus is adapted to generate a multitude of small bubbles having a diameter of approximately 1 millimeter and therefore have a high surface area to volume ratio which is conducive to the efficient and rapid dissolving of oxygen within the waste material. The generation of the small bubbles is performed by the introduction of air immediately adjacent the propeller which, when it is rapidly rotated produces an area of reduced pressure immediately behind the propeller and causes the air to be induced or sucked downwardly through the shaft 16 and into the material. The rapidly rotating axial thrust propeller effectively breaks the air into fine bubbles as it moves the material downwardly within the reservoir.

It has been observed that during operation, the small bubbles that are generated by the propeller are driven downwardly into the material with the extremely small or finer bubbles being driven downwardly to a depth that may be as great as 15 feet. It has also been noted that many of the smaller bubbles will remain at that depth for a prolong period, although it is generally true that the larger the bubbles, the more rapid is the rate of ascent to the surface of the material. The apparatus is effective, however, to produce a great number of extremely small bubbles which are driven downwardly by the flow of the material and the bubbles do not merge into one another but in fact diverge as they travel. The apparatus is sufficiently effective in its production of fine bubbles that a froth or foam is often produced on the surface of the material which may approach several feet in thickness. Since the frothy material may interfere with the entrance of air into the upper end of the hollow shaft 16, it has been found necessary to place a sheet of material 70 to cover the bottom area inside of the float assembly 12. As shown in FIG. 3, the sheet 70 is attached by bolts or the like to an inward extension 72 of the lower wall 30 of each side of the float assembly 12 and has a circular opening in the center thereof to permit passage of the hollow shaft 16 therethrough. Since the bubbles will tend to rise upwardly, it is also preferred that a hollow cylinder 74 be attached to the opening in the sheet 70 so as to generally concentrically surround the hollow shaft 16. It is preferred that the hollow cylinder extend downwardly into the material a short distance as shown, so that the cylinder provides a barrier to prohibit the bubbles from moving horizontally along the underside of the bottom wall 30 and sheet 70 and rising inside of the opening within the sheet of material. The cylinder thereby prevents most of the foam material from rising inside the float assembly near the upper end of the shaft 16. Thus, the only foamed or frothy material which may enter the space inside of the float assembly walls 26 above the sheet 70 must rise from below and directly enter the underside of the cylinder 74.

In keeping with the invention, the enclosure 20 serves at least two useful functions in that it provides partial protection against the elements in the event the apparatus is substantially completely exposed to the elements in an open reservoir. Additionally, it provides another barrier to keep the foamed material from passing over the float assembly into the interior area thereof which may also eventually close the opening within the collar fitting 40 and deprive the hollow shaft 16 of a supply of air. To this end, and as shown in FIG. 3, a modification of the apparatus includes an elongated cylindrical extension 76 which may fit around the flanged aperture 22 of the enclosure 20 to further increase the effective height of the aperture in the event the thickness of the frothy or foamed material exceeds the height of the enclosure 20. In the event the cylindrical extension 76 is used, it is seen that the supply of air travels from the top of the extension 76 downwardly through the aperture 22 inside of the enclosure 20 through the opening 52 into the hollow shaft 16 and downwardly until it exits through the aperture 60 rearwardly of the propeller 18.

In keeping with the invention, it is preferred that the walls of the float assembly 12, the enclosure 20, the extension 76 if it is used, as well as the hollow shaft 16 be fabricated of stainless steel, although other corrosion resistant materials may be used, if desired. In this connection, it is noted that the entire float assembly 12 may be fabricated of a structurally strong lightweight material such as molded urethane plastic or the like, and may be of one piece design. Such a substitution of materials may result in a cost reduction in terms of the cost of the material as well as in the cost of assembly. It should also be understood that the float assembly can be other than of a quadrangular configuration, particularly if it is formed of a molded material.

In accordance with an important aspect of the invention, the apparatus has significant operational advantages over apparatus which is suspended from above the material since, by virtue of its floating upon the surface, it may follow the elevation of the material in a reservoir even through the surface elevation may vary over a considerable vertical distance. However, it is quite apparent that damage may be sustained by the rotating shaft 16 and propeller 18 in the event the propeller would strike the bottom of the reservoir and, to this end, the float assembly is provided with a number of anchors 78 to which may be attached tether lines or the like to limit the downwardly movement of the apparatus in the event the elevation of the material in the reservoir drops to a level where the propeller could strike the bottom. Additionally, the tether lines are also effective to confine the apparatus to a limited area during its operation.

Thus, an apparatus for aerating and circulating clean waste material has been shown and described which is effective and efficient in its operation and satisfies all of the previously mentioned objects and advantages.

What is claimed is:

1. Apparatus for aeration and circulation of liquified animal waste material in a reservoir, comprising, in combination:

a float assembly adapted to floatingly support the apparatus on the surface of the material in the reservoir;

a rotatable hollow shaft extending downwardly from the float assembly and into the material with the upper end thereof projecting above the material and including means therein for permitting air to enter the shaft;

an axial thrust propeller rigidly secured to the lower end of the shaft, the shaft having one or more openings in the lower end thereof adapted to permit air to exit adjacent the propeller;

drive means for rotating the shaft and propeller to draw air downwardly through the shaft and out of the openings in the lower end thereof to generate a multitude of small bubbles and propel them downwardly through the material; and barrier means attached to the float assembly for preventing the bubbles from rising upwardly within the apparatus including a vertically positioned hollow cylinder generally concentrically surrounding the shaft and extending downwardly into the material.

2. Apparatus as defined in claim 1 wherein the barrier means includes a generally flat sheet extending across the float assembly and having an aperture in the center thereof (adapted to permit the rotatable shaft to extend therethrough), the hollow cylinder generally fitting the aperture in the sheet and being attached to the sheet.

3. Apparatus as defined in claim 1 including an upwardly extending enclosure adapted to cover the drive means and including at least one aperture in the upper portion thereof for communicating a supply of air to the interior thereof.

4. Apparatus as defined in claim 3 including an upward cylindrical extension attached to the enclosure and surrounding the aperture.

5. Apparatus as defined in claim 1 wherein the float assembly is hollow and filled with a lightweight bouyant material adapted to displace fluid and thereby ensure that the float assembly will floatingly support the apparatus.

6. Apparatus as defined in claim 5 wherein the bouyant material is foamed styrene plastic.

7. Apparatus as defined in claim 1 provided with securing means including a flexible tether for confining the apparatus in a predetermined area during operation in the reservoir and for preventing downward movement of the apparatus in the event the elevation of the material in the reservoir decreases to prevent the propeller from striking the bottom of the reservoir and damaging the apparatus.

8. Apparatus as defined in claim 1 wherein the hollow shaft extends downwardly into the material approximately 2 feet.

9. Apparatus as defined in claim 1 wherein the drive means comprises an electric motor carried by the float assembly with the motor drive shaft being downwardly directed and having secured thereto an annular collar fitting having a number of axial passages therein adapted to communicate air therethrough, the outer surface of the collar fitting engaging the inside surface of the hollow rotatable shaft, and the collar fitting including means for removably securing the hollow shaft thereto.

10. Apparatus as defined in claim 9 wherein the hollow rotatable shaft has an annular flange extending radially outwardly therefrom with the interior surface of the flange being inwardly tapered in the downward direction and the outside diameter of the collar fitting being cooperatively tapered so that tightening of the securing means will draw the collar fitting and flange together.

11. Apparatus as defined in claim 10 wherein the securing means includes a number of threaded first bolts adapted to pass through oversized apertures in the collar fitting and engage threaded apertures within the flange and adapted to urge the collar fitting and flange toward one another when tightened.

12. Apparatus as defined in claim 11 including a number of threaded second bolts adapted to engage threaded apertures in the collar fitting and abut the flange to forcibly separate the collar fitting and flange upon rotation of the second bolts in a predetermined direction, provided the first bolts are sufficiently loosened.

* * * * *